US010198770B2

(12) United States Patent
Jones et al.

(10) Patent No.: US 10,198,770 B2
(45) Date of Patent: Feb. 5, 2019

(54) COMPUTERIZED SYSTEM AND METHOD FOR CLASSIFYING PAYMENTS TO HEALTH CARE PRACTITIONER AND IDENTIFYING VIOLATIONS

(75) Inventors: Jeffrey M. Jones, Palo Alto, CA (US); Timothy Kvanvig, Raleigh, NC (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 1203 days.

(21) Appl. No.: 13/598,734

(22) Filed: Aug. 30, 2012

(65) Prior Publication Data
US 2014/0067629 A1    Mar. 6, 2014

(51) Int. Cl.
*G06Q 40/08* (2012.01)

(52) U.S. Cl.
CPC .................. *G06Q 40/08* (2013.01)

(58) Field of Classification Search
CPC ........ G06Q 10/10; G06Q 50/22; G06Q 30/04; G06Q 40/08; G06Q 20/102; G06Q 40/12; G06Q 20/20; G06Q 20/26; G06Q 20/347; G06Q 20/40
See application file for complete search history.

(56) References Cited

U.S. PATENT DOCUMENTS 6,810,383 B1 * 10/2004 Loveland ............... G06Q 10/06
705/7.13
2010/0223172 A1 * 9/2010 Donnelly ............... G06F 19/328
705/34
2012/0130736 A1 * 5/2012 Dunston ................ G06Q 50/22
705/2
2013/0030828 A1 * 1/2013 Pourfallah ............ G06Q 50/22
705/2

OTHER PUBLICATIONS

SBA, "Contract Responsibilities" SBA.Gov Aug. 23, 2011.*
DocInfo, "Physician Profile Report" from Federation of State Medical Boards—Federation Physician Data Center Jan. 1, 2012.*
Defintion—"aggregate" as downloaed on Oct. 14, 2015.*
HSR, "Pharmaceuticasl and Prescribing" HSR: Health Service Research 45:1 (Feb. 2010).*
Vermont, "Guide to Vermont's Prescribed Products Gift Ban and Disclosure Law for 2012 Disclosures" Vermont Office of the Attorney General—Dec. 2011.*

* cited by examiner

*Primary Examiner* — Neal Sereboff
(74) *Attorney, Agent, or Firm* — Kraguljac Law Group, LLC (57) ABSTRACT

Systems, methods, and other embodiments associated with spend monitoring for pharmaceutical and life science concerns are described. In one embodiment, a method includes receiving transaction data describing a payment made to a health care practitioner. A practitioner identifier that uniquely identifies the practitioner and a transaction type identifier that classifies the transaction as one of several predefined transaction types are associated with the transaction data. The method includes storing a spend record that includes the transaction data, the practitioner identifier, and the transaction type identifier in a spend record database.

13 Claims, 9 Drawing Sheets

COMPUTERIZED SYSTEM AND METHOD FOR CLASSIFYING PAYMENTS TO HEALTH CARE PRACTITIONER AND IDENTIFYING VIOLATIONS

BACKGROUND

Legislation in several states, and more recently at the federal level, requires life science companies to disclose financial arrangements with healthcare providers. The premise of the legislation is that there may be a perceived (or actual) conflict of interest in some of the shared financial interests. The overall goal of the legislators is to both regulate certain activities of life science companies and require transparency for a range of interactions between health care providers and life science companies. For life science companies conducting multiple transactions with numerous healthcare providers compliance with these regulations is cumbersome.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

FIGS. 4A-4E are screen shots from one embodiment of a system associated with a spend monitor.

DETAILED DESCRIPTION

The Patient Protection and Affordable Health Care Act (H.R. 3590) that includes the Physician Payment Sunshine Act (section 6002) (PPSA) was signed into law in March 2010. These federal laws require that records of transaction data be maintained by life science companies and reported to the Secretary of Health and Human Services. However, the reporting requirements in several states, such as Vermont, Massachusetts, D.C., Maine, West Virginia, Minnesota, Nevada, California, are not pre-empted by the federal laws. Federal and states laws may require differing reporting timelines, frequency, and content for reporting. Therefore, the reporting requirements can become conflated and complicated.

The laws focus on banning or limiting gifts and other financial benefits offered to healthcare providers, gift and financial transaction reporting requirements, and adoption of codes of conduct. The federal and state laws are implemented incrementally as individual states pass laws with differing requirements. Additionally, some states have regulated manufacturer advertising, industry sponsored clinical trials, and basic research. The variety of regulated activities makes it challenging to collect and summarize transaction data from various data sources.

Previously, administrators manually located payments to health care practitioners (HCPs) and enter transaction data for each payment. The payment location and data entry may be outsourced to external service providers. However, this manual recordation approach merely recorded payments in chronological or other arbitrary fashion. Thus, the transaction data did not offer the ability to view spending per HCP, by payment type, to identify suspect payments. The manual recordation did not provide integration across the lines of business, and was expensive if outsourced. Systems and methods are described herein that provide systematic integration to achieve spending reporting compliance in the life sciences, pharmaceutical, and medical fields.

Figure 1:
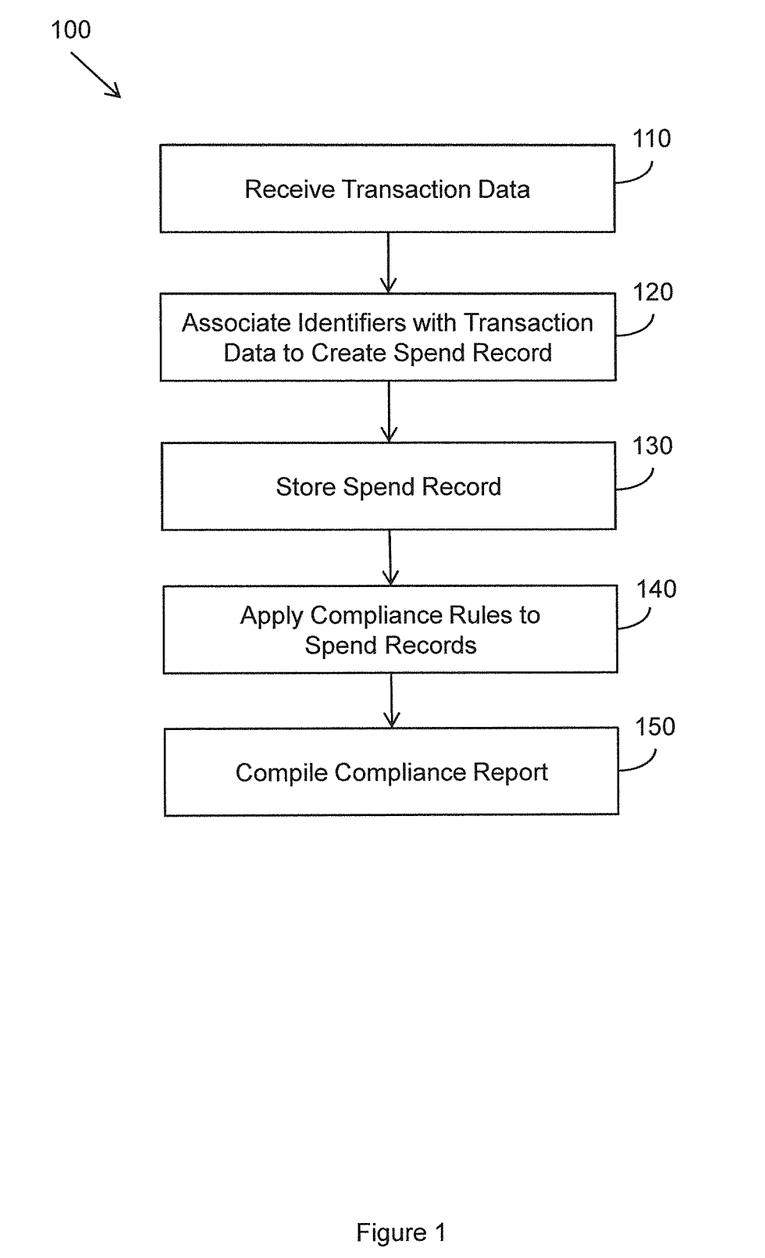
FIG. 1 illustrates one embodiment of a method associated with a spend monitor.

With reference to FIG. 1, one embodiment of a method 100 is associated with compliance spend monitor is illustrated. The method 100 is performed in a web service application used for managing transaction data for life science companies such as pharmaceutical, medical device, biological, and medical supply manufacturers. Web-based protocol handlers allow web-based applications to operate online allowing transaction data to be harvested from any number of external sources in real-time. Furthermore, the transaction data can be integrated and analyzed.

At 110, transaction data regarding payments made by a life science company to an HCP is received. Transaction data includes information about the amount of a payment to an HCP, the date on which the payment was made, the form of payment, and the nature of the payment (e.g., notes regarding consulting fees, compensation for non-consulting services, honoraria, gifts, entertainment, food, travel, education, research, charitable contributions, royalties or licenses, current or prospective ownership or investment interests, direct compensation for serving as faculty or as a speaker for a medical education program, and grants). The transaction data may also includes payments made to a non-HCP on behalf of an HCP. For example, a limo company may be paid to provide transportation to an HCP on behalf of the life science company.

The transaction data is captured, at 110, by accessing a number of data sources from the life science company. The transaction data may be retrieved automatically (e.g., according to a schedule) or upon occurrence of a triggering event, such as payment of an invoice for services rendered or reimbursement of an expense report that includes lunch with an HCP. Alternatively, the sources may be configured to send transaction data when the transactions data is generated.

Example transaction data sources, which may be accessed via a web-based protocol, include accounts payable processing systems, invoicing systems (e.g., to detect payments to non-HCPs on behalf of an HCP), expense report processing systems, and other human resources or financial systems. In one embodiment, the collection of transaction data is performed, via web, without impacting the normal operation of the financial systems at the life science company. Transaction data is captured and parsed to determine if it includes a reference to an HCP. Transaction data that references an HCP or other predetermined trigger term(s) is captured.

If an HCP is referenced in the transaction data, at 120, practitioner and transaction type identifiers are associated with the transaction data to facilitate compliance with reporting requirements. The practitioner identifier uniquely identifies the practitioner. In one embodiment, a practitioner data source, such as a medical personnel directory or licensing authority, is accessed to retrieve a unique practitioner identifier that identifies the HCP who received the payment. Assigning the practitioner identifier to each transaction facilitates tracking payments made to the same HCP, as may be required by various regulations. Further, more detailed information may be retrieved from the practitioner data source about an HCP to augment data recorded in the transaction data. For example, information about an HCP's medical group, business address, or any other information that facilitates compliance with reporting requirements may be retrieved from the practitioner data source so that it need not be included in transaction data. If more than one practitioner identifier is mapped to practitioner information in the transaction (e.g., two doctors having the same name), an interface may be provided to allow manual selection of the appropriate practitioner based on address or other information.

The transaction type identifier classifies the transaction as one of several predefined transaction types. This classification may be performed automatically by identifying a transaction type related term (e.g., speaker fee, speech, talk, presentation) in the transaction data and retrieving a transaction type identifier (e.g., speaker fee) that is mapped to the term. The selection of practitioner identifiers and/or transaction type identifiers may be performed automatically using semantic analysis or manually through a series of screens and prompts that are provided to allow a data entry technician to rationalize the raw transaction data. As the types of transactions that are regulated increase, additional terms may be mapped to new transaction types, making the method readily adaptable.

At 130, the method includes storing a spend record that includes the transaction data, the practitioner identifier, and the transaction type identifier in a spend record database. At 140, the method includes applying one or more compliance rules to spend records in the spend record database. The compliance rules may be retrieved from a compliance rule data source, such as a regulating body. In this manner, most recent versions of compliance rules can be used, and responsibility for keeping the rules up to date is maintained by the regulating body or other specialized organization, rather than the life science company. The compliance rules may specify, for example, a limit on total payments to a given HCP over a certain period, a limit on total payments for a certain type of transaction, or a limit on any single payment to an HCP. Compliance rules may vary from state to state, so a user may be prompted to select appropriate compliance rules for application to their transaction data.

At 150, the method includes compiling a compliance report that summarizes results of the application of the compliance rules to the spend records in the spend record database. The compliance report may include a series of compliance queries that correspond to various compliance rules. For example, a query that checks a compliance rule that limits a total monetary amount paid to a given HCP could aggregate payments on a per HCP basis and return the practitioner identifier for any practitioners that have been paid more than is allowed. The results returned by the series of compliance queries may be used to populate fields of the compliance report. Retrieval and application of the compliance rules may be performed by the spend monitor service as well as transmitting the compliance report to regulatory agencies.

Figure 2:
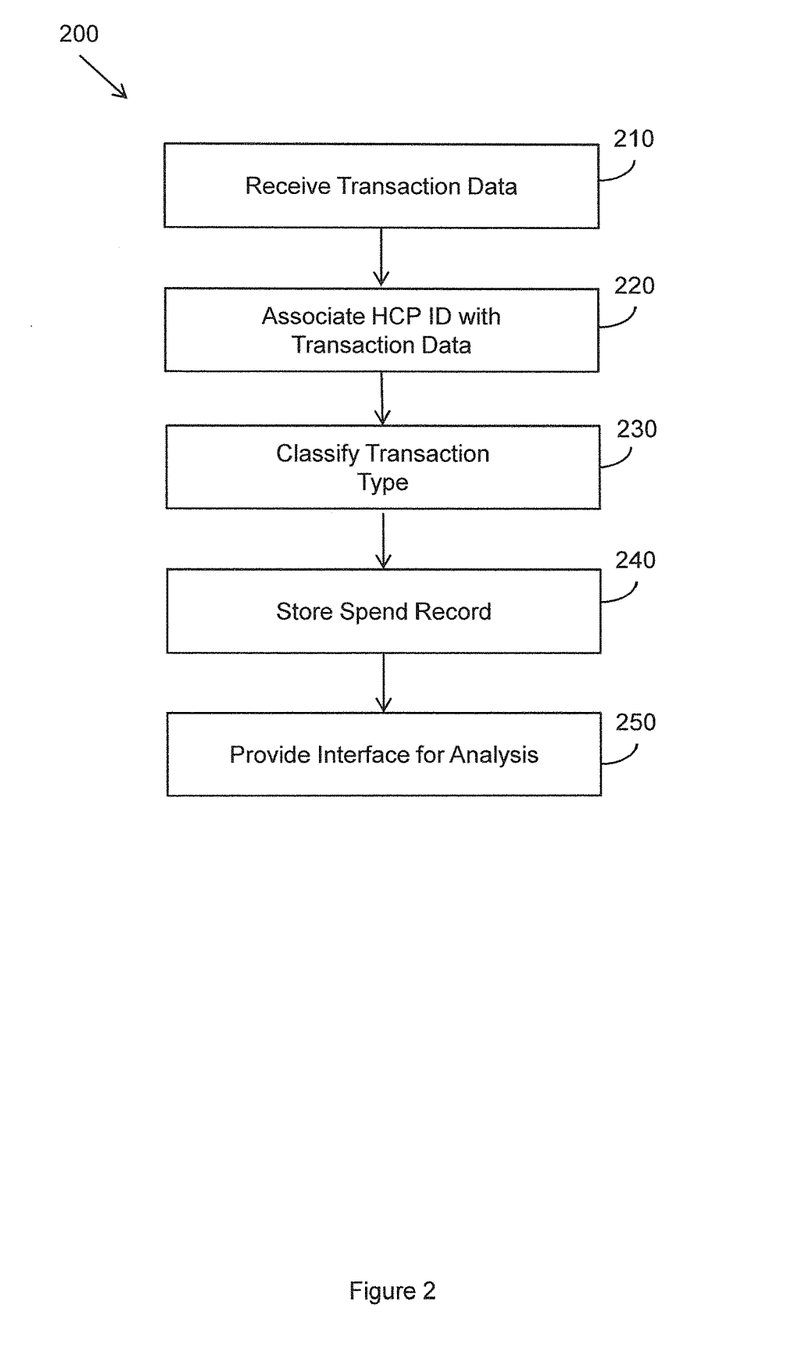
FIG. 2 illustrates another embodiment of a method associated with a spend monitor.

FIG. 2 illustrates one embodiment of a method 200 associated with a spend monitor. The method includes, at 210, receiving transaction data describing a payment made to a health care practitioner. The transaction data specifies a monetary amount paid to the health care practitioner. The method includes, at 220, associating a practitioner identifier with the transaction data. At 230, the payment is classified by associating a transaction type identifier with the transaction data. At 240, the method includes storing a spend record comprising the transaction data, the practitioner identifier; and the transaction type identifier in a spend record database. At 250, the method includes providing an interface for processing queries on the stored spend records.

The spend record database that stores the spend records may be physically located in a remote database (with respect to the life science company) and made accessible via the web. In one embodiment, a spend monitor service may perform the method 200 and access the life science company's transaction data, rationalize the data by appending the practitioner and transaction type identifiers, and store the data in a database that can be accessed by the life science company by web.

Figure 3:
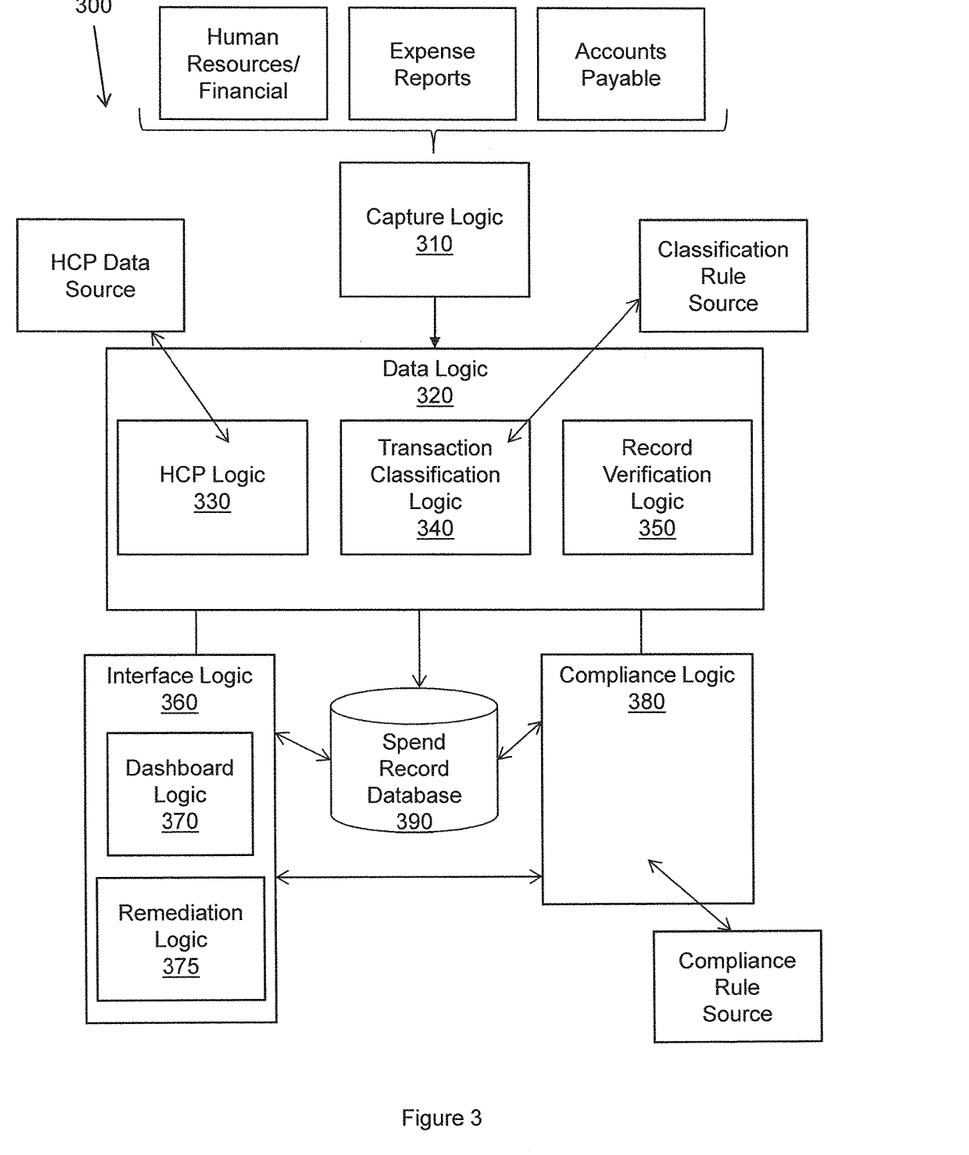
FIG. 3 illustrates one embodiment of a system associated with a spend monitor.

With reference to FIG. 3, one embodiment of a system 300 is associated with a spend monitor is illustrated. The system includes a capture logic 310 configured to receive transaction data describing a payment made to a health care practitioner. The system 300 also includes a data logic 320 configured to rationalize the transaction data received by the capture logic 310 and transform the transaction data into a format suitable for compliance analysis. The data logic 320 includes an HCP logic 330 configured to associate a practitioner identifier with the transaction data to create a spend record and to store the spend record in a spend record database 390. In one embodiment, an HCP data source, such as a medical personnel directory or licensing authority, is accessed to retrieve a unique practitioner identifier that identifies the HCP who received the payment.

The data logic 320 includes a transaction classification logic 340 configured to classify the payment by associating a transaction type identifier with the transaction data. The transaction classification logic 340 may access a classification rule source that stores rules for mapping a preferred transaction type identifier to one or more commonly used transaction terms that may be found in the transaction data. The classification rule source may store transaction type identifiers that are used in compliance reporting. Thus, the same classification rule source may be used to provide common transaction type identifiers for transaction data from more than one life science company. The classification rule source may be updated as needed when preferred terms change.

The data logic 320 includes a record verification logic 350 that is configured to confirm that selected fields of each spend record contain acceptable values. The record verification logic 350 applies one or more spend record rules to the spend record and may also provide an interface to receive manual edits to the spend record when the spend record does not conform to the spend record rules. The record verification logic 350 ensures that only "clean" spend records (e.g., complete records with valid practitioner identifiers and transaction type identifiers) are stored in the spend record database 390. This record verification function greatly improves the accuracy of spend reporting and compliance analysis. In addition, the record verification logic may apply one or more transaction rules to the stored spend records and flag spend records that violate a transaction rule. An example transaction rule may be a limit on a payment made in a single transaction. Any payment over the limit may be flagged for approval by an authorized person.

The system includes an interface logic 360 configured to provide an interface for processing queries on stored spend records. The interface logic includes a dashboard logic 370 configured to perform predetermined queries on the stored spend records and to display results to the queries in a predetermined format. If the spend record database 390 includes materialized views, the dashboard logic 370 may be configured to access the materialized views to populate fields on the dashboard display. The interface logic 360 also includes a remediation logic 375 that identifies the payments that do not meet the compliance rules. The remediation logic 375 may provide an interface for selecting one or more remediation actions to be performed to address compliance rule violations (e.g., reporting the violation to the proper regulating body, review of the violation by an authorized person, and so on).

The computing system 300 also includes a compliance logic 380 configured to access a compliance rule data source to retrieve one or more compliance rules and apply the one or more compliance rules to the spend records. The compliance logic 380 may also be configured to compile a compliance report that summarizes results of the application of the compliance rules to the spend records in the spend record database 390.

The spend record database 390 may be structured according to a predetermined schema that is well suited for processing the dashboard and/or compliance queries. A data mart that includes materialized views for spending over various aggregation periods may be included in the spend record database 390.

Figure 4A:
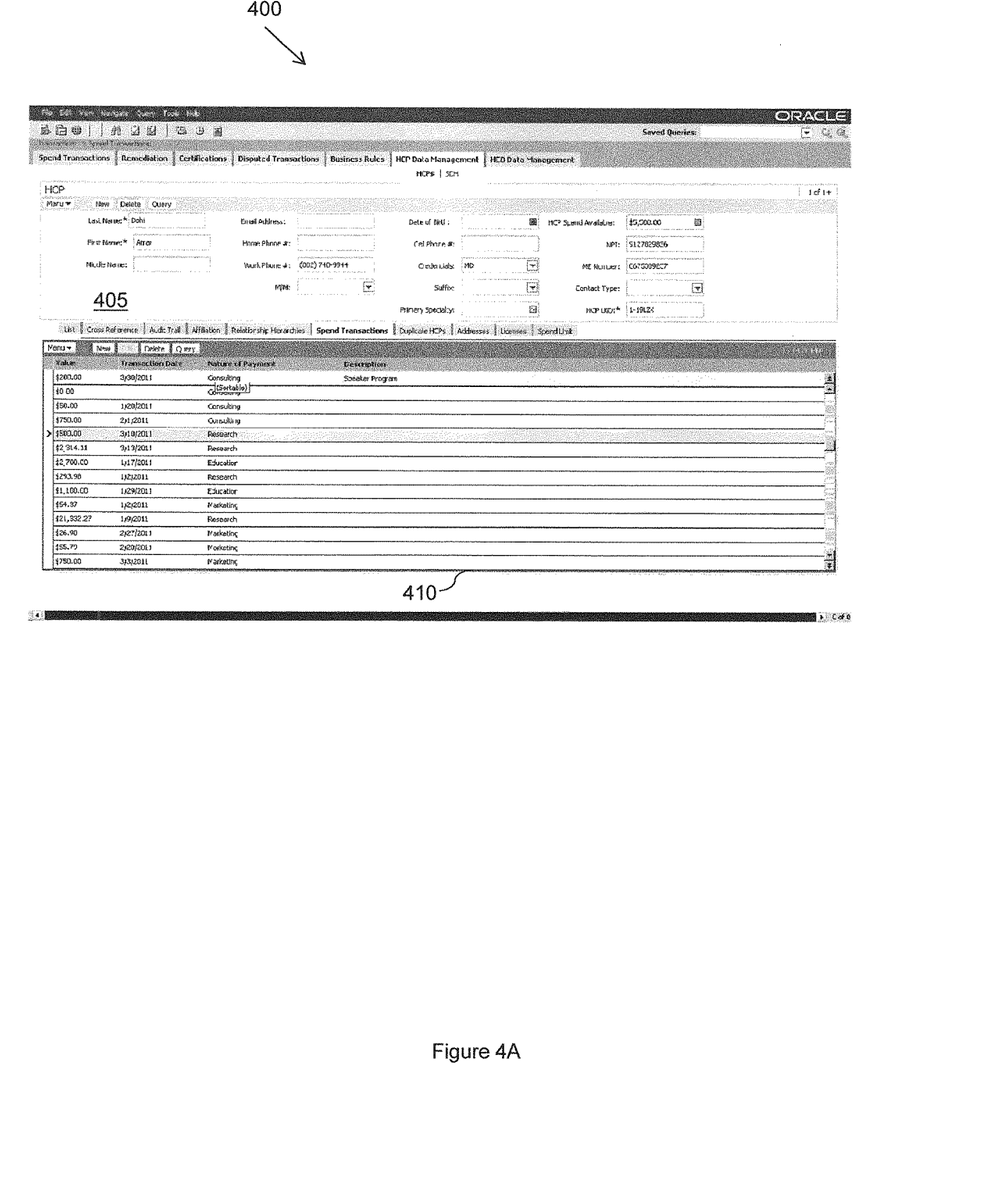

FIGS. 4A-4E illustrate example screenshots that may be provided by an interface logic associated with one embodiment of a spend monitor. FIG. 4A shows an HCP management screen 400 that includes an HCP description section 405 that includes fields for storing identifying information for a given HCP. A spend history portion 410 lists payments made to the HCP described in section 405. A remaining amount of payments that may be made to the HCP within regulation limits is also displayed on the HCP management screen 400.

Figure 4C:
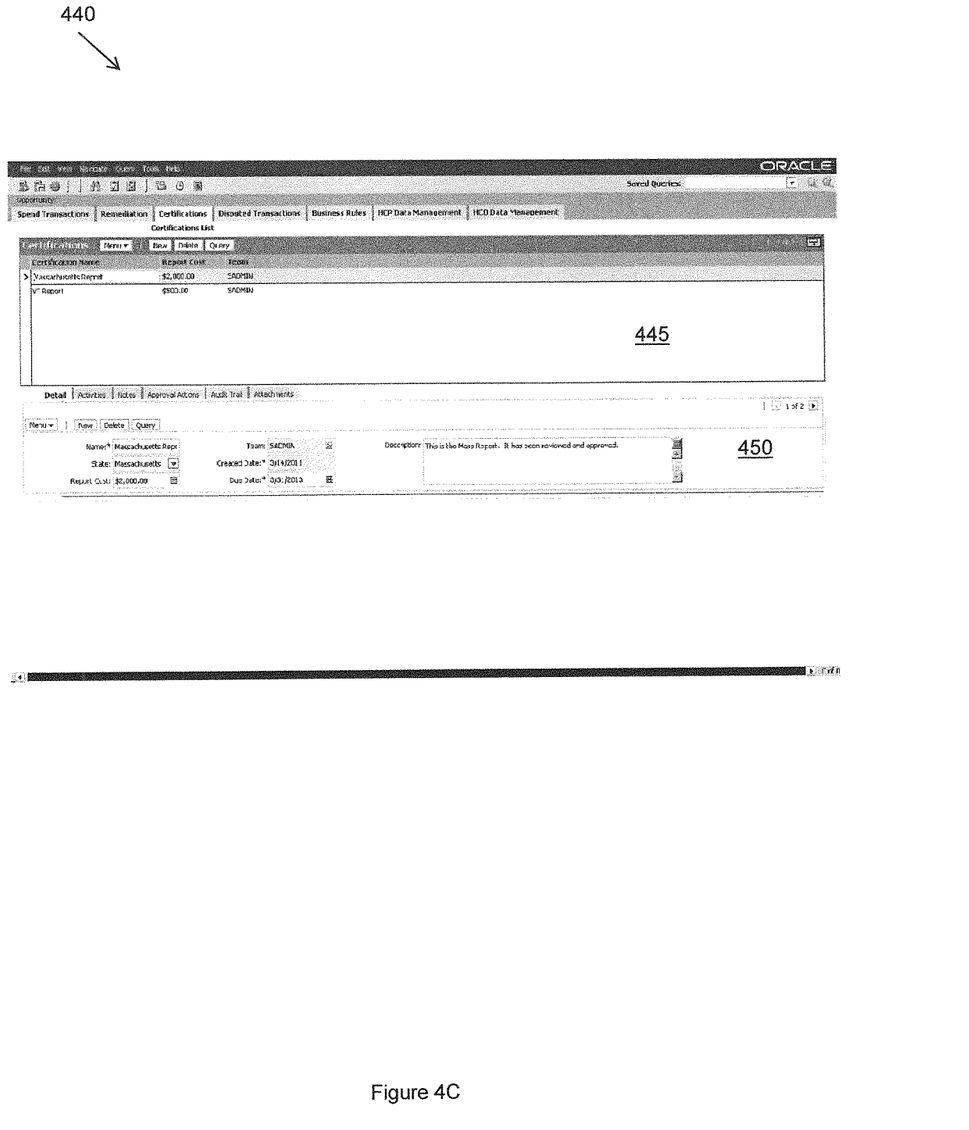
Figure 4D:
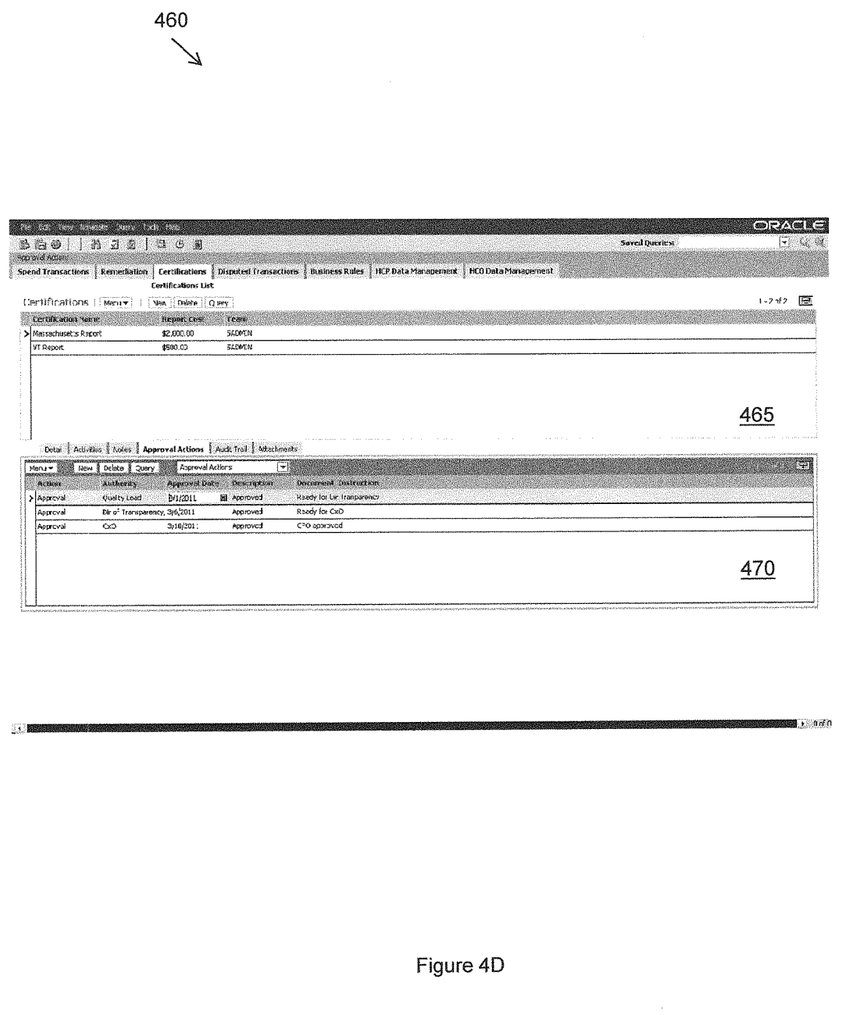

A spend transaction screen 420 is shown in FIG. 4B. The spend transaction screen provides a list 425 of all spend records. The list of spend records may be sorted on any selected attribute. FIG. 4C shows a certification screen 440. The certification screen 440 includes a state selection portion 445 that displays states for which compliance rules are stored by the system. Status information about a selected state's compliance report is shown in a status section 450. FIG. 4D illustrates an approval screen 460. The approval screen 460 includes a state selection portion 465 that displays states for which compliance rules are stored by the system. An approval section 470 shows an approval chain for a selected state's compliance report and indicates which approvals have been made and which are still pending.

Figure 4E:
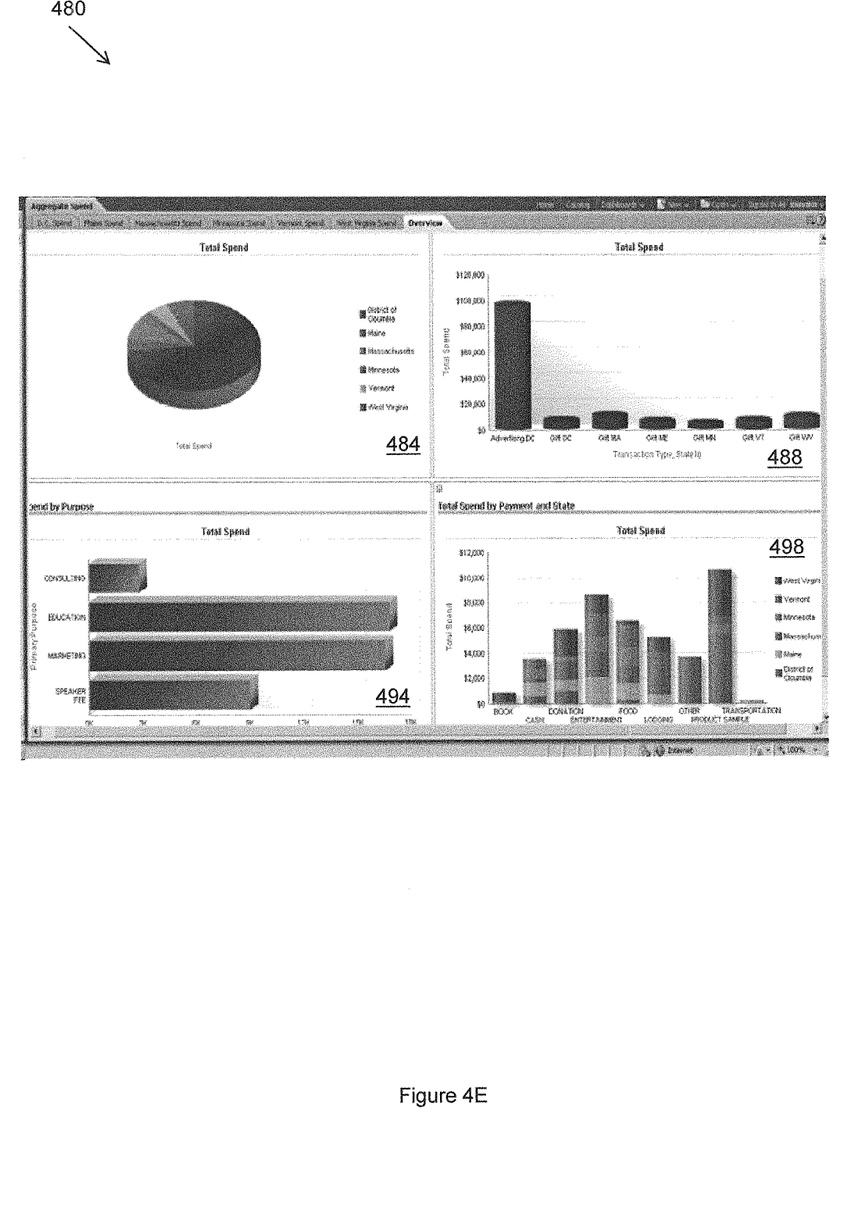

FIG. 4E shows an analysis screen 480 that illustrates a dashboard that shows a several types of analysis that can be performed on the spend records. A pie chart 484 shows overall spending broken out by state. A bar graph 488 shows spending broken out by state and transaction type. Another bar graph 494 shows a comparison of spending on various transaction types. A bar graph 498 shows total spending for each transaction type as well as an amount of each transaction type that is spent on a state by state basis.

Figure 5:
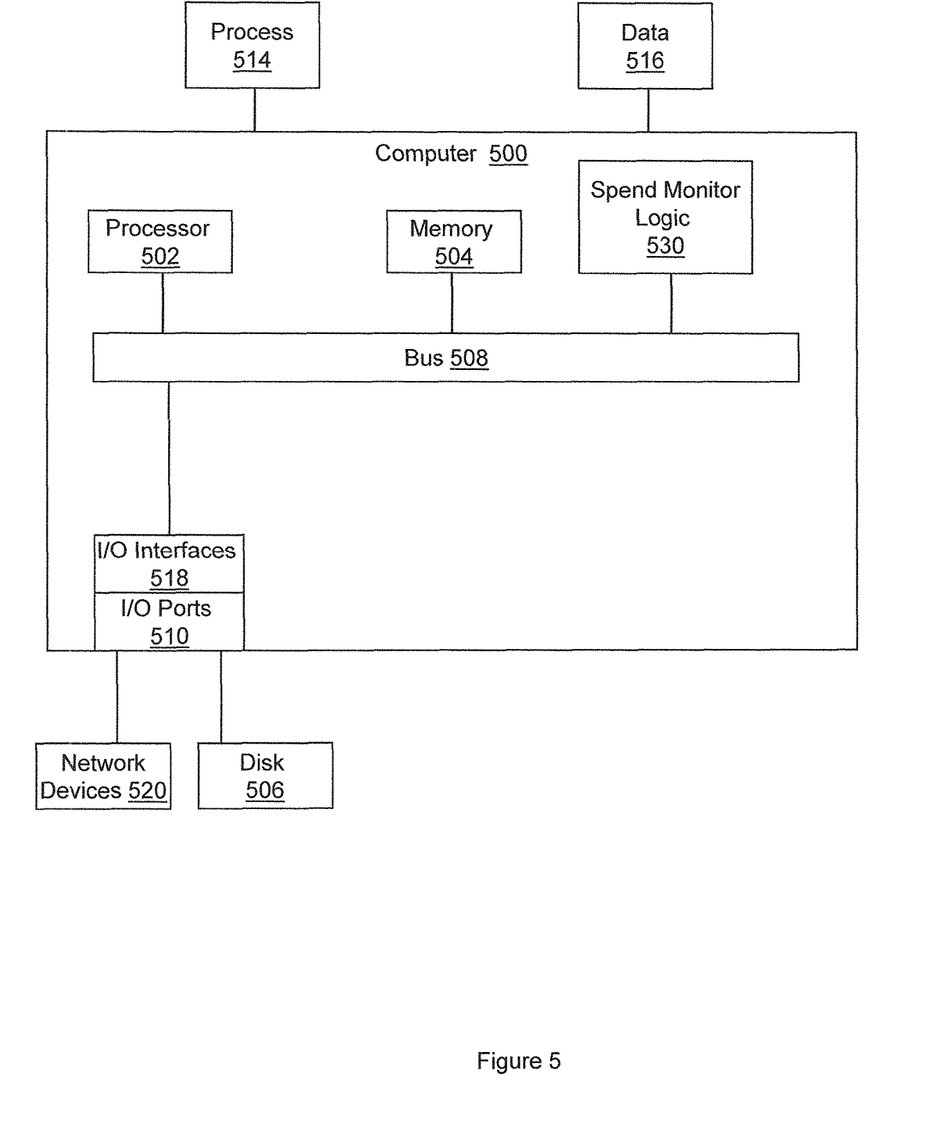
FIG. 5 illustrates an embodiment of a computing system in which example systems and methods, and equivalents, may operate.

FIG. 5 illustrates an example computing device in which example systems and methods described herein, and equivalents, may operate. The example computing device may be a computer 500 that includes a processor 502, a memory 504, and input/output ports 510 operably connected by a bus 508. In one example, the computer 500 may include a spend monitor logic 530 configured to monitor payments to HCPs and create spend records for storage in a spend record database. In different examples, the spend monitor logic 530 may be implemented in hardware, a non-transitory computer-readable medium with stored instructions, firmware, and/or combinations thereof. While the spend monitor logic 530 is illustrated as a hardware component attached to the bus 508, it is to be appreciated that in one example, the spend monitor logic 530 could be implemented in the processor 502.

In one embodiment, spend monitor logic 530 is a means (e.g., hardware, non-transitory computer-readable medium, firmware) for performing spend monitoring. The means may be implemented, for example, as an ASIC programmed to perform spend monitoring. The means may also be implemented as stored computer executable instructions that are presented to computer 500 as data 516 that are temporarily stored in memory 504 and then executed by processor 502.

Generally describing an example configuration of the computer 500, the processor 502 may be a variety of various processors including dual microprocessor and other multi-processor architectures. A memory 504 may include volatile memory and/or non-volatile memory. Non-volatile memory may include, for example, ROM, PROM, and so on. Volatile memory may include, for example, RAM, SRAM, DRAM, and so on.

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, a tape drive, a Zip drive, a flash memory card, a memory stick, and so on. Furthermore, the disk 506 may be a CD-ROM drive, a CD-R drive, a CD-RW drive, a DVD ROM, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., PCIE, 1394, USB, Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

In another embodiment, the described methods and/or their equivalents may be implemented with computer executable instructions. Thus, in one embodiment, a non-transitory computer-readable medium is configured with stored computer executable instructions that when executed by a machine (e.g., processor, computer, and so on) cause the machine (and/or associated components) to perform the methods of FIGS. 1 and 2 and to produce the screen shots of FIGS. 4A-4E.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
PROM: programmable ROM.
EPROM: erasable PROM.
EEPROM: electrically erasable PROM.
SQL: structured query language.
OQL: object query language.
USB: universal serial bus.
XML: extensible markup language.
WAN: wide area network.

"Computer component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Logic", as used herein, includes but is not limited to hardware, firmware, a non-transitory computer readable medium that stores instructions, instructions in execution on a machine, and/or combinations of each to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"Query", as used herein, refers to a semantic construction that facilitates gathering and processing information. A query may be formulated in a database query language (e.g., SQL), an OQL, a natural language, and so on.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A non-transitory computer-readable medium storing computer-executable instructions that when executed by at least a processor of a computer cause the computer to:
   access, via an internet connection, one or more data sources maintained by a company and retrieve transaction data that includes data of payments made by the company, wherein the transaction data is described by terms;
   parse, by at least the processor, the transaction data to identify terms that reference a health care practitioner and to identify one or more monetary amounts paid to the health care practitioner;
   classify, by at least the processor, the one or more monetary amounts paid to the health care practitioner from the transaction data by identifying transaction type from the terms in the transaction data, and retrieving a transaction type identifier that is mapped to the term, where the transaction type identifier classifies the term as one of several different types of monetary payments including gift payments, wherein the transaction type identifier is determined by comparing the term of the monetary amount to a set of stored predefined transaction types;
   identify, by at least the processor accessing a practitioner data source, a practitioner identifier that uniquely identifies the health care practitioner;
   create and store, by at least the processor, a spend record in a spend record database, where the spend record includes data corresponding to: the transaction data, the practitioner identifier, and the transaction type identifier, where creating a spend record that includes the practitioner identifier and the transaction type identifier in the spend record facilitates web-based querying of spend records stored in the spend record database by a provider of the transaction data based, at least in part, on the practitioner identifier of transaction type identifier;
   access, by at least the processor, a compliance rule data source that includes one or more compliance rules that specify limits on at least gift payments made to the health care practitioner;
   query, by at least the processor, the compliance rule data source to identify a compliance rule associated with the transaction type that specifies a limit on monetary amounts that include gift payments paid to the health care practitioner for transactions of the transaction type;
   query, by at least the processor, the spend record database to aggregate the monetary amounts in the spend records for each of the practitioner identifiers based on the transaction type identifier to generate a resulting aggregated monetary amount made to the health care practitioner for gift payments;
   compare, by at least the processor, the resulting aggregated monetary amount for each of the practitioner identifiers with the limit on the monetary amounts that include gift payments; and
   compile, by at least the processor, a compliance report that reports a result of the comparison to identify the health care practitioners that have the aggregated monetary amount that is more than the limit on the monetary amounts that include gift payments, and generate a flag to indicate a violation for the associated spend record.

2. The non-transitory computer-readable medium of claim 1, wherein the instructions that cause the computer to retrieve the transaction data comprises instructions for causing the computer to retrieve a payment record from a financial transaction processing system.

3. The non-transitory computer-readable medium of claim 1, where the instructions further comprise providing an interface for selecting one or more remediation actions when the aggregated monetary amount exceeds the limit on the monetary amounts.

4. The non-transitory computer-readable medium of claim 1, where the instructions further comprise instructions that cause the computer to transmit the compliance report to an external compliance authority.

5. The non-transitory computer-readable medium of claim 1, where the instructions further comprise instructions for causing the computer to generate an interface to receive and process queries on the spend records.

6. A computing system, comprising:
   a processor;
   capture logic stored in a non-transitory computer readable medium that includes executable instructions executable by the processor and configured to cause the processor to:
      access, via an internet connection, one or more data sources maintained by a company, and retrieve transaction data that includes data of payments made by the company, wherein the transaction data is described by terms;
      parse, by at least the processor, the transaction data to identify terms that reference a health care practitioner and to identify one or more monetary amounts paid to the health care practitioner;
   data logic stored in a non-transitory computer readable medium that includes executable instructions executable by the processor and configured to cause the processor to:
      classify, by at least the processor, the one or more monetary amounts paid to the health care practitioner from the transaction data by identifying a transaction type from the terms in the transaction data, and retrieving a transaction type identifier that is mapped to the term, where the transaction type identifier classifies the term as one of several different types of monetary payments including gift payments, wherein the transaction type identifier is determined by comparing the term of the monetary amount to a set of stored predefined transaction types;

identify, by at least the processor accessing a practitioner data source, a practitioner identifier that uniquely identifies the health care practitioner;

create and store, by at least the processor, a spend record in a spend record database, where the spend record includes data corresponding to: the transaction data, the practitioner identifier, and the transaction type identifier, where creating a spend record that includes the practitioner identifier and the transaction type identifier in the spend record facilitates web-based querying of spend records stored in the spend record database by a provider of the transaction data based, at least in part, on the practitioner identifier of transaction type identifier;

compliance logic stored in a non-transitory computer readable medium that includes executable instructions executable by the processor and configured to cause the processor to:

access, by at least the processor, a compliance rule data source that includes one or more compliance rules that specify limits on at least gift payments made to the health care practitioner;

query, by at least the processor, the compliance rule data source to identify a compliance rule associated with the transaction type that specifies a limit on monetary amounts that include gift payments paid to the health care practitioner for transactions of the transaction type;

query, by at least the processor, the spend record database to aggregate the monetary amounts in the spend records for each of the practitioner identifiers based on the transaction type identifier to generate a resulting aggregated monetary amount made to the health care practitioner for gift payments;

compare, by at least the processor, the resulting aggregated monetary amount for each of the practitioner identifiers with the limit on the monetary amounts that include gift payments; and compile, by at least the processor, a compliance report that reports a result of the comparison to identify the health care practitioners that have the aggregated monetary amount that is more than the limit on the monetary amounts that include gift payments, and generate a flag to indicate a violation for the associated spend record.

7. The computing system of claim 6, further comprising an interface logic stored in a memory in the computing system, wherein the interface logic includes instructions executable by the processor and configured to cause the processor to generate an interface for processing queries on stored spend records and displaying results of the comparison on a display screen of the computing system; and where the interface logic further comprises a dashboard logic configured to cause the processor to perform predetermined queries on the stored spend records and to display results to the queries in a predetermined format.

8. The computing system of claim 7, where the interface logic further comprises a remediation logic configured to cause the processor to provide an interface for selecting one or more remediation actions when the aggregated monetary amount exceeds the limit on monetary amounts.

9. A computer-implemented method performed by a computer system including at least a processor and a memory for executing instructions, the method comprising:

accessing, via an internet connection, one or more data sources maintained by a company, and retrieve transaction data that includes data of payments made by the company, wherein the transaction data is described by terms;

parsing, by at least the processor, the transaction data to identify terms that reference a health care practitioner and to identify one or more monetary amounts paid to the health care practitioner;

classifying, by at least the processor, the one or more monetary amounts paid to the health care practitioner from the transaction data by identifying a transaction type from the terms in the transaction data, and retrieving a transaction type identifier that is mapped to the term, where the transaction type identifier classifies the term as one of several different types of monetary payments including gift payments, wherein the transaction type identifier is determined by comparing the term of the monetary amount to a set of stored predefined transaction types;

identifying, by at least the processor accessing a practitioner data source, a practitioner identifier that uniquely identifies the health care practitioner;

creating and storing, by at least the processor, a spend record in a spend record database, where the spend record includes data corresponding to: the transaction data, the practitioner identifier, and the transaction type identifier, where creating a spend record that includes the practitioner identifier and the transaction type identifier in the spend record facilitates web-based querying of spend records stored in the spend record database by a provider of the transaction data based, at least in part, on the practitioner identifier of transaction type identifier;

accessing, by at least the processor, a compliance rule data source that includes one or more compliance rules that specify limits on at least gift payments made to the health care practitioner;

querying, by at least the processor, the compliance rule data source to identify a compliance rule associated with the transaction type that specifies a limit on monetary amounts that include gift payments paid to the health care practitioner for transactions of the transaction type;

querying, by at least the processor, the spend record database to aggregate the monetary amounts in the spend records for each of the practitioner identifiers based on the transaction type identifier to generate a resulting aggregated monetary amount made to the health care practitioner for gift payments;

comparing, by at least the processor, the resulting aggregated monetary amount for each of the practitioner identifiers with the limit on the monetary amounts that include gift payments; and compiling, by at least the processor, a compliance report that reports a result of the comparison to identify the health care practitioners that have the aggregated monetary amount that is more than the limit on the monetary amounts that include gift payments, and generate a flag to indicate a violation for the associated spend record.

10. The computer-implemented method of claim 9, where receiving the transaction data comprises receiving a payment record from a financial transaction processing system.

11. The computer-implemented method of claim 9, further comprising providing an interface for selecting one or more remediation actions when the aggregated monetary amount exceeds the given limit on monetary amounts.

12. The computer-implemented method of claim 9, further comprising transmitting the compliance report to an external compliance authority.

13. The computer-implemented method of claim 9, further comprising providing an interface to receive and process queries on the spend records.

\* \* \* \* \*

UNITED STATES PATENT AND TRADEMARK OFFICE
CERTIFICATE OF CORRECTION

PATENT NO. : 10,198,770 B2
APPLICATION NO. : 13/598734
DATED : February 5, 2019
INVENTOR(S) : Jones et al.

Page 1 of 1

It is certified that error appears in the above-identified patent and that said Letters Patent is hereby corrected as shown below:

In the Claims

In Column 9, Line 45, in Claim 1, after "identifying" insert -- a --.

Signed and Sealed this
Twenty-eighth Day of January, 2020

Andrei Iancu
*Director of the United States Patent and Trademark Office*